US010013138B2

(12) United States Patent
Itani (10) Patent No.: US 10,013,138 B2
(45) Date of Patent: Jul. 3, 2018

(54) METHOD AND APPARATUS FOR SECURE DATA ENTRY USING A VIRTUAL INTERFACE

(71) Applicant: Atheer, Inc., Mountain View, CA (US)

(72) Inventor: Sleiman Itani, East Palo Alto, CA (US)

(73) Assignee: Atheer, Inc., Mountain View, CA (US)

(*) Notice: Subject to any disclaimer, the term of this patent is extended or adjusted under 35 U.S.C. 154(b) by 565 days.

(21) Appl. No.: 13/657,720

(22) Filed: Oct. 22, 2012

(65) Prior Publication Data

US 2014/0115520 A1 Apr. 24, 2014

(51) Int. Cl.
| G06F 3/0484 | (2013.01) |
| G06F 3/0481 | (2013.01) |
| G02B 27/01 | (2006.01) |
| G06T 19/20 | (2011.01) |
| G06F 3/0487 | (2013.01) |

(52) U.S. Cl.
CPC ........ *G06F 3/04815* (2013.01); *G06F 3/0487* (2013.01)

(58) Field of Classification Search
CPC ............... G06F 3/04886; G06F 3/0488; G06F 3/04883; G06F 3/013; G06F 3/0236; G06T 19/00; G01C 21/3664
USPC .......................... 715/773, 831, 757, 771, 778
See application file for complete search history.

(56) References Cited

U.S. PATENT DOCUMENTS

| 6,091,546 | A  | * | 7/2000  | Spitzer  | G02B 27/017 345/8 |
| 8,199,126 | B1 | * | 6/2012  | Taubman  | G06F 3/011 345/156 |
| 8,228,315 | B1 | * | 7/2012  | Starner  | G02B 27/017 345/175 |
| 8,316,319 | B1 | * | 11/2012 | Patel    | G06F 3/04883 710/38 |
| 8,427,434 | B1 | * | 4/2013  | Merolla  | G06T 15/20 178/18.01 |
| 2007/0089164 | A1 | * | 4/2007 | Gao   | G06F 3/04886 726/4 |
| 2010/0109920 | A1 | * | 5/2010 | Spradling | G06F 21/36 341/23 |
| 2011/0213664 | A1 | * | 9/2011 | Osterhout | G02B 27/017 705/14.58 |
| 2013/0002559 | A1 |   | 1/2013 | Vardi | |
| 2013/0241927 | A1 |   | 9/2013 | Vardi | |

(Continued)

*Primary Examiner* — Jeffrey A Gaffin
*Assistant Examiner* — Nhat Huy T Nguyen
(74) *Attorney, Agent, or Firm* — Mohr Intellectual Property Law Solutions, P.C.

(57) ABSTRACT

Method and apparatus for secure data entry. In the method a virtual data entry interface is generated, and is outputted so as to be readable only by the user. The user then enters data using the interface. The apparatus includes at least one display, or optionally a pair of displays that output a 3D stereo image. It also includes a data processor, and at least one sensor, or optionally a pair of sensors that capture 3D stereo data. The data processor generates a virtual data entry interface, and communicates it to the display or displays. The displays output the virtual interface such that it is only readable by the user. The sensor or sensors receives data entered by the user's actions, and send signals representing those actions to the processor. The processor then detects the data from the signals.

43 Claims, 7 Drawing Sheets

(56) References Cited

U.S. PATENT DOCUMENTS

2013/0278631 A1* 10/2013 Border ................ G02B 27/017
                                                                345/633

* cited by examiner

METHOD AND APPARATUS FOR SECURE DATA ENTRY USING A VIRTUAL INTERFACE

FIELD OF THE INVENTION

This invention relates to secure data entry, wherein data being entered is protected from being intercepted as the data is being entered. This invention relates more particularly to a method and apparatus for securing data entry against such interception through the use of virtual data entry interfaces such as virtual keypads.

DESCRIPTION OF RELATED ART

The notion of a keypad as a data entry interface is well known. Computers in particular utilize keypads for data entry, along with numerous other fixed and portable devices such as automatic teller machines (ATMs), calculators, telephones, etc.

Typically the term "keypad" is taken to imply a physical device. However, the functionality of a keypad does not require a physical device, and may be accomplished without one. For example, a touch-sensitive display may be used to show an image of a keypad, with the user touching the screen at appropriate points to simulate keypad data entry. Similarly, an image of keypad may be projected onto a table or other flat surface, with a camera or other monitoring device used to determine when a user presses the projected keys. In such cases, the keypad may be considered to be a virtual device, in that they keypad does not physically exist as an independent object. That is, while the touch screen, table, etc. may have physical substance, there is no physical substance to the keypad itself, even though it is functional as a keypad.

Thus, a virtual keypad is one is that perceived to be, and functions as, a keypad, but that is not a physical object in and of itself. Nevertheless, the keypad is both functional and perceivable to its user, and is therefore a "real" working device. The keypad is somewhat analogous to a projected image in that sense; an image projected on a screen has no physical substance, but nevertheless is a real image, and can serve the same function as a physical photograph, painting, etc. Likewise, a keypad can be a functional device even without physical substance, and can therefore serve as a data interface.

However, conventional virtual keypads suffer from many of the same security weaknesses as physical keypads. Notably, the act of data entry itself provides an opportunity for unauthorized interception of the data. Such interception is sometimes referred to as "peeping".

Peeping circumvents many conventional forms of data security. For instance, firewalls can protect stored or transmitted data by restricting access to data in a system from outside the system, and encryption can protect stored or transmitted data while that data is inside a system by making the data unreadable. However, when a user enters data, that data typically is unencrypted, and the user's actions in entering data (e.g. by typing on a keypad) take place in the physical world, rather than within the electronic system. Thus, approaches directed to protecting data systems themselves frequently are ineffective against peeping attacks, since the data is observed/intercepted while outside the system.

In a simple form, peeping can be carried out by "looking over the shoulder" of a person using a conventional keypad, virtual or otherwise. By watching a person enter data on a keypad, a person watching can determine what data is being entered. Peeping is particularly problematic for security data such as passwords, PIN codes, encryption keys, and so forth, but is a concern for most or all types of data.

It will be understood that for such peeping, where the person intercepting the data can see both the keypad and the data entry process, it makes no difference whether the keypad is physical or virtual. Both types of keypad are susceptible.

Physical keypads have a disadvantage of being fixed in a single configuration. That is, because they are physical devices, the configuration of the keys cannot readily be changed; for example, on a particular numeric keypad, the number 1 is always in the same place. Thus, if a peeper can observe the keypad configuration at any time, they will know what the keypad configuration is at the time of data entry. As a result, they need not observe the keypad during data entry; watching the motions of the user is sufficient to determine what data is being entered.

Attempts have been made to rectify these problems using virtual keypads. Since they are less limited by a physical structure, virtual keypads can be reconfigured from time to time. Use of virtual keypads makes it more difficult to peep in circumstances where the peeper can only see the user, and cannot see the keypad at the same time. However, if a peeper can see both the user entering data and the keypad, they can still intercept the data as it is being entered, regardless of the configuration of the keypad.

It is noted that a peeper need not directly view the user and keypad in order to intercept the data being entered. Mirrors, wireless cameras, and other devices may be used while a peeper remains out of direct line of sight, stays at another location altogether, or even records the data entry activity for later viewing. Suitable surveillance devices are widely available, compact, and inexpensive.

It should be understood that although a virtual keypad is used as an example, the functions and security concerns described are relevant to other interfaces as well.

In view of the preceding, there is a need for a more secure method of data entry, one resistant to peeping.

BRIEF SUMMARY OF THE INVENTION

The present invention contemplates a variety of systems, apparatus, methods, and paradigms for data entry.

In one embodiment of the present invention, a method is provided for secure data entry, that includes generating a virtual data entry interface, and receiving data entered by a user using that virtual data interface. The virtual data interface is outputted so as to be readable substantially only to the user. Limited readability tends to provide security against peeping attacks, since the interface is not visible to a person attempting such a peeping attack.

The virtual interface may be generated to be visible substantially only to the user. Alternately, the virtual interface may be generated to be in focus substantially only for the user. The virtual interface may be outputted such that the user him or herself substantially blocks the line of sight to the interface for anyone except the user.

The virtual interface may be outputted in front of the user's eyes, and close to them, so as not to be visible from behind or adjacent to the user. The virtual interface may be outputted so as to be in focus only at a distance corresponding to the position of the user's eyes. For example, the virtual interface may be outputted on a head mounted display worn by the user.

The configuration of the virtual interface may be variable, such that when the interface is generated, its configuration can differ from its previous configuration(s). The user may manually change the configuration of the interface, and/or may actuate a function to change the configuration of the interface. The virtual interface may change automatically, and may change automatically each time the interface is generated.

The virtual interface may be generated as a 3D virtual object. In particular, the interface may be generated as a virtual keypad. The virtual keypad may include multiple iterations of individual symbols. The virtual interface may be generated as a color selection palette.

The step of receiving data may include manual detection of the actions of the user. Such detection may include detecting manipulation of an end-effector such as a finger by the user, detecting a hand manipulation of the user, detecting the user's eye movement, and/or detecting the user's brain events, such as through electromagnetic sensing.

The virtual interface may be outputted so as to appear to the user to substantially align with a physical object.

In another embodiment of the present invention, an apparatus is provided for secure data entry. The system includes at least one display, a data processor in communication with the display, and at least one sensor in communication with the processor. The data processor generates a virtual interface. The display outputs the interface generated by the processor, such that the virtual interface is only readable by the user. The sensor receives data entered by actions of the user in using the interface, and sends a signal representative of those actions to the processor. The processor determines the data based on the signal.

The apparatus may include first and second displays, which may be adapted to output a 3D stereo image. The virtual interface may be a 3D stereo interface.

The apparatus may include first and second sensors, and those sensors may be cameras. The sensor or sensors may be adapted to capture a 3D stereo image, and to the processor may be adapted to detect the action of the user from that 3D stereo image. The sensor may be directed towards the user's hands, or towards the user's face.

The sensor may be a brain sensor.

The display, data processor, and sensor may be part of an integrated head mounted display.

In yet another embodiment of the present invention, a virtual data entry interface is provided. The interface includes a plurality of virtual features in communication with a data system. The virtual features are manipulatable by the user, such that the user can enter data by manipulating them. The interface is readable substantially only to the user.

In another embodiment of the present invention, a method of secure data entry is provided. The method includes generating a stereo 3D virtual data entry interface, visually detecting through 3 stereo 3D image capture a user's manipulation of an end-effector in relation to the virtual interface, and receiving data entered by the user through that manipulation. The virtual interface is outputted on a head mounted display, so as to be readable substantially only to the user.

In another embodiment of the present invention, an apparatus is provided for secure data entry. The apparatus includes first and second displays adapted for 3D stereo output, a data processor in communication with the displays, and first and second sensors adapted for stereo 3D image capture in communication with the processor. The data processor is adapted to generate a stereo 3D virtual data entry interface. The displays are adapted to output the virtual interface to a user such that the virtual interface is readable substantially only to the user. The sensors are adapted to receive data entered by an action of the user using the virtual interface, and to send a signal representative of the action to the processor. The processor is adapted to detect the data from that signal. The displays, processor, and sensors are disposed on a head mounted display.

In still another embodiment of the present invention, an apparatus is provided for secure data entry. The apparatus includes means for generating a virtual data entry interface, means for outputting the virtual interface to a user, and means for receiving data entry by the user to the virtual interface, with the virtual interface being readable substantially only by the user.

The virtual interface may be outputted in front of the user's eyes and proximate thereto, so as not to be visible from a point of view behind or adjacent the user. The virtual interface may be a stereo 3D virtual interface. The means for receiving user data entry may detect motions. The generating means, outputting means, and receiving means may be disposed on a head mounted display. The means for generating the virtual interface may generate the interface in a new configuration each time the virtual interface is generated.

BRIEF DESCRIPTION OF THE SEVERAL VIEWS OF THE DRAWINGS

Like reference numbers generally indicate corresponding elements in the figures.

DETAILED DESCRIPTION OF THE INVENTION

Figure 1A:
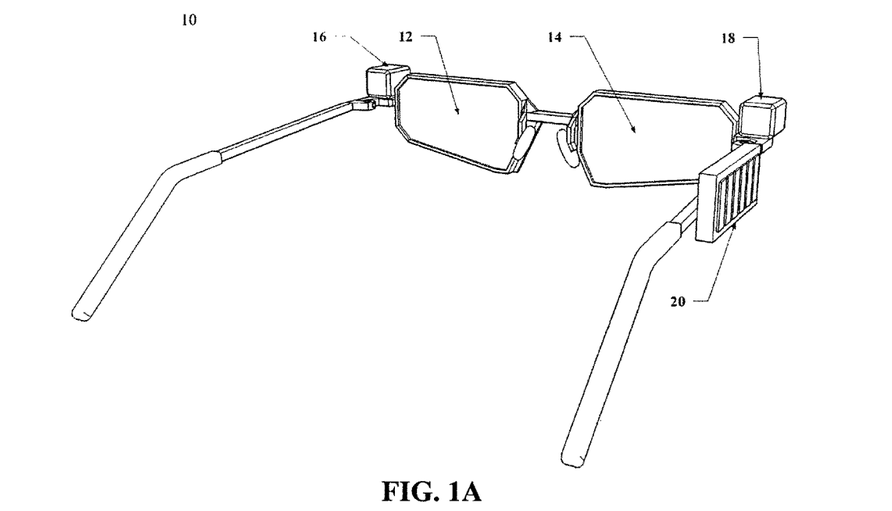
FIG. 1A illustrates an embodiment of an apparatus for secure data entry in accordance with the principles of the present invention, in the form of a 3D head mounted display.
Figure 1B:
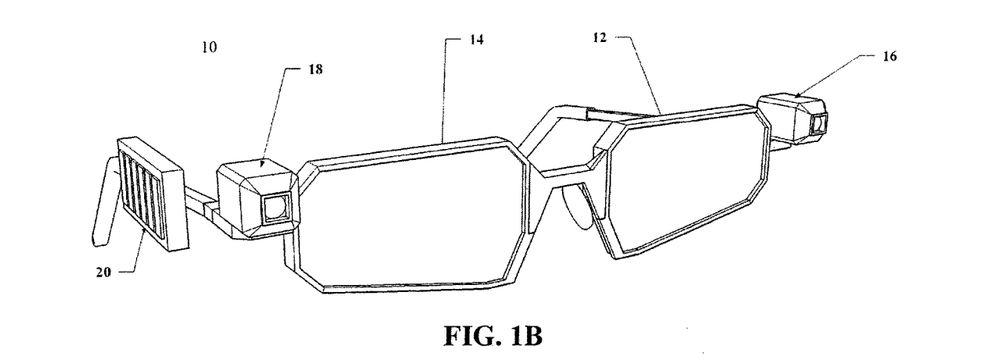
FIG. 1B illustrates the apparatus of FIG. 1A from another angle.

Referring to FIGS. 1A and 1B, an embodiment of an apparatus 10 for secure data entry in accordance with the principles of the present invention is shown. As illustrated, the apparatus 10 is in the form of a head mounted display, resembling a pair of glasses. However, other embodiments may be equally suitable.

As shown in FIG. 1A, the apparatus 10 includes a first display 12 and a second display 14. These displays are adapted to output a virtual data entry interface (not shown in FIG. 1A). An arrangement of first and second displays 12 and 14 as shown in FIG. 1A is advantageous, in that it enables a stereo simulation of 3D objects, environments, and interfaces. Stereo simulation can be accomplished, for example, by outputting slightly different images with the first and second displays 12 and 14, comparable to what would be seen by the user's left and right eyes if they were looking at a physical object in 3D space. However, arrangements with more or fewer displays may be equally suitable.

A range of devices may be suitable for use as the first and second displays 12 and 14, including but not limited to light emitting diodes (LED), organic light emitting diodes (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. In addition, either digital or analog display technologies may be equally suitable. Moreover, although as illustrated the displays 12 and 14 are in the form of screens that display the interface on their surfaces, this is an example only. Other arrangements, including but not limited to systems that display images directly onto a user's eyes, may be equally suitable.

The apparatus 10 also includes a first sensor 16 and a second sensor 18. These sensors are adapted to detect actions by a user of the apparatus 10, in particular actions that represent the entry of data to the apparatus 10. The sensors 16 and 18 are also adapted to generate a signal representative of the user's actions.

As noted with regard to the displays 12 and 14, an arrangement of first and second sensors 16 and 18 as shown in FIG. 1A is advantageous, in that it enables stereo 3D imaging of the environment. However, arrangements with one sensor or with three or more sensors may be equally suitable.

As illustrated, the sensors 16 and 18 are compact digital cameras. A range of cameras, including but not limited to CMOS and CCD cameras, may be suitable. Moreover, sensors other than cameras likewise may be equally suitable.

The apparatus 10 also includes a data processor 20. The processor 20 is in communication with the first and second displays 12 and 14, and also with the first and second sensors 16 and 18. The manner by which the communication is accomplished may vary from one embodiment to another; in one embodiment the components may communicate by direct wire connection, but other arrangements may be equally suitable. The processor 20 is adapted to generate the virtual data entry interface, and to output that interface to the first and second displays 12 and 14. The processor 20 is also adapted to receive the signal representative of the user's actions as generated by sensors 16 and 18.

In addition, the processor 20 is adapted to detect the data being entered by the user, based on signal received from the sensors 16 and 18. The manner or manners by which the processor detects the data may vary based on the types of sensors 16 and 18 used in any particular embodiment of the apparatus 10, and on the types of user actions that are anticipated to be used for data entry. In one embodiment, sensors 16 and 18 are cameras arranged to generate 3D information regarding objects in their combined field of view, and users enter data by entering keystrokes on a virtual keypad. In such an embodiment, the processor may detect the data based on determining the positions and/or motions of the user's fingers as they manipulate the keypad. For example, the user's hands and fingers could be distinguished from the background based on their shape, their color, their texture, specific features, etc., and the position and/or motions of the user's hands in the physical 3D world could then be correlated with the positions of individual keys on the virtual keypad in virtual 3D space, so as to determine which keys the user is striking. A range of algorithms and data processing techniques may be suitable for such an embodiment.

A range of general-purpose, special-purpose, and embedded systems may be suitable for use as the data processor 20. Moreover, it may be equally suitable for the data processor 20 to consist of two or more physical or logical processor components.

Figure 2A:
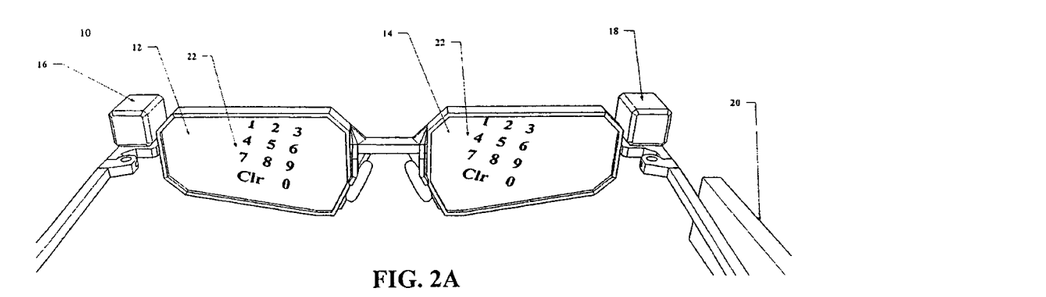
FIG. 2A illustrates the apparatus of FIG. 1 with a virtual interface outputted thereon.
Figure 2B:
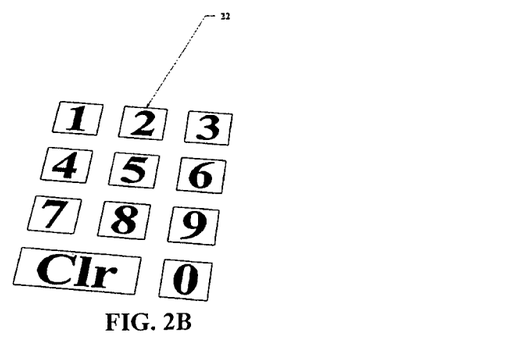
FIG. 2B illustrates a virtual interface, in the form of a 2D keypad.

FIG. 2A shows an embodiment of the apparatus 10, displaying an embodiment of a virtual interface 22 in accordance with the principles of the present invention. FIG. 2B shows the interface 22 as it would appear on its own, as visible to a user. As illustrated, the interface 22 is a numeric keypad, with a plurality of keys, each key being marked with a number. The interface 22 is outputted on the first and second displays 12 and 14 so that each of a user's eyes perceives the interface 22 from a slightly different perspective, such that the interface 22 appears to the user as a virtual construct in 3D space.

Because the interface 22 appears as an object in 3D space to the user, the user can interact with the interface in a fashion similar to that for interacting with a solid object. For instance, for the arrangement in FIG. 2B, the user can contact individual keys with their fingers, so as to indicate the numbers on those keys, thus entering numeric data. The first and second sensors 18 and 20 detect the user's finger motions, and generate a signal representative of those motions, which signal is then sent to the processor 20. The processor 20 interprets the signal, identifying the sequence of keys that the user has pressed, so determining the numeric data. The numeric data, now present in the processor 20, can then be used just as if the data were entered by means of a solid mechanical keypad or other physical interface.

Figure 2C:
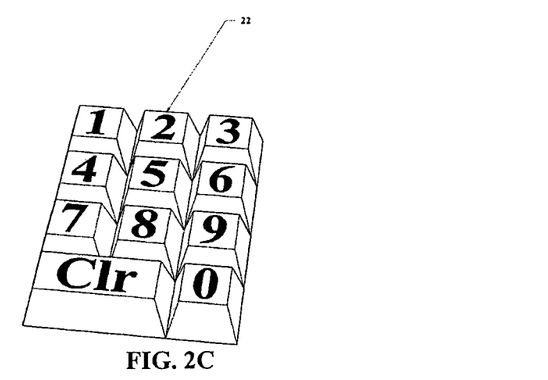
FIG. 2C illustrates another virtual interface, in the form of a 3D keypad.

FIG. 2C shows an alternative virtual interface 22. While similar to that shown in FIG. 2B, the interface 22 in FIG. 2C is presented as a 3D virtual object, rather than as a flat two-dimensional construct. That is, in this embodiment the interface 22 appears as a set of realistically three-dimensional keys, similar to those in a conventional mechanical keypad.

As illustrated in FIGS. 2B and 2C, the virtual interface 22 is shown as a free-floating construct. However, while it can be advantageous to generate a virtual keypad or other interface 22 in free space, at any arbitrary point convenient to the user, such an arrangement is not necessary. For example, the interface 22 may be projected so as to appear to be part of or rest on a physical surface, or to overlap with a solid physical object, even a mechanical keypad. Such an arrangement can be advantageous in that the object, surface, etc. provides tactile feedback to the user, i.e. when the user presses a key they feel the physical contact between their fingertip and the surface/object.

It should be understood that the arrangements for the virtual interface 22 as shown in FIGS. 2B and 2C are shown as examples only, and that other arrangements may be equally suitable.

Figure 3A:
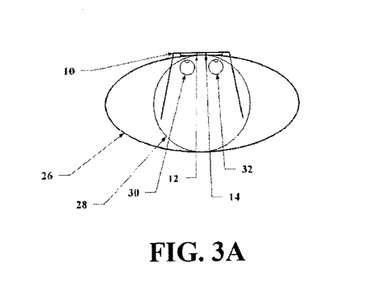
FIG. 3A illustrates an arrangement of the apparatus of FIG. 1, in use by a wearer.

FIG. 3A shows a schematic, top-down view of a user 26 wearing an apparatus 10 in accordance with the principles of the present invention. As shown, the apparatus 10 is in the form of a pair of glasses worn on the head 28 of the user 26, with the first and second displays 12 and 14 disposed in front of and proximate to the user's left and right eyes 30 and 32, respectively. In such an arrangement, a virtual interface (not visible) would be outputted on displays 12 and 14. The virtual interface can thus be made readable to the user, but not to others.

Figure 3B:
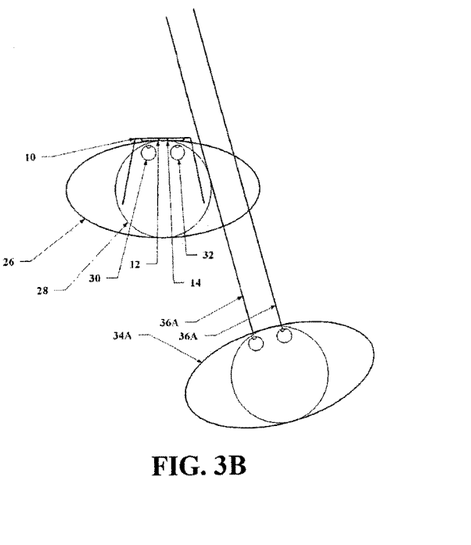
FIG. 3B illustrates the arrangement of FIG. 3A, with the addition of a prospective peeper.
Figure 3C:
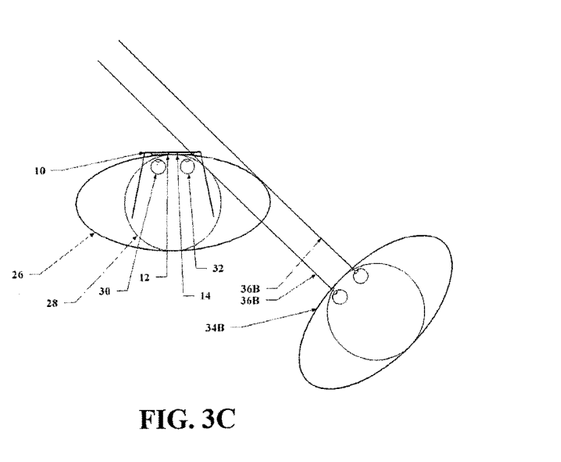
FIG. 3C illustrates the arrangement of FIG. 3A, with the addition of a prospective peeper.
Figure 3D:
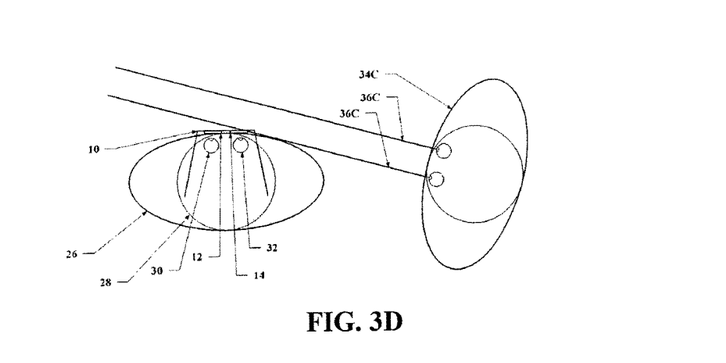
FIG. 3D illustrates the arrangement of FIG. 3A, with the addition of a prospective peeper.

FIGS. 3B, 3C, and 3D show similar schematics to that in FIG. 3A, but with the addition of prospective "peepers" 34A, 34B, and 34C at various positions, that is, other persons attempting to observe data entry by the user 26.

According to the principles of the present invention, the apparatus 10 displays the virtual interface in such a manner that the user 26 may see it, but that a peeper 34A, 34B, or 34C may not. Given the arrangement illustrated in FIGS. 3B, 3C, and 3D, outputting the virtual interface only to the user may be accomplished through multiple means (which are not necessarily exclusive).

For example, given an apparatus 10 configured as glasses, the distance between the user's eyes 30 and 32 and the displays 12 and 14 is typically small, on the order of one to several centimeters at most. However, as may be understood from FIGS. 3B, 3C, and 3D the distance between a peeper 34A, 34B, or 34C and the displays 12 and 14 is typically more on the order of many centimeters to many meters. Even if, hypothetically, a peeper 34A, 34B, or 34C were able to approach to within a few centimeters of the displays 12 and 14, such approach would be readily apparent to the user 26, rendering peeping highly problematic.

The relative differences in eye-to-display distance for the user 26 and a peeper 34A, 34B, or 34C allow for convenient steps to oppose peeping. For example, the images on the displays 12 and 14, and thus the interface itself, can be presented in such a fashion as to only be in focus for the user 26. A peeper 34A, 34B, or 34C, at a much greater distance from the displays 12 and 14, might see nothing more than a blur of light, from which they would be unable to determine any information. Likewise, the images on the displays 12 and 14 and thus the interface can be presented at such a size, or at such a level of contrast, as to be only readable at distances suited for the user 26 but not for prospective peeper 34A, 34B, or 34C. Other arrangements for limiting the readability of the interface may also be equally suitable.

In addition, the apparatus 10 may take advantage of geometry in providing data security. As shown in the embodiment of FIGS. 3B, 3C, and 3D, the apparatus 10 is configured such that the user's head 28 itself blocks viewing of the displays 12 and 14 by a prospective peeper 34A, 34B, or 34C. The displays 12 and 14, and thus the virtual interface, are not visible from behind or adjacent to the user 26, since the line of sight 36A, 36B, or 36C of the peeper 34A, 34B, or 34C is substantially obstructed by the user 26.

As will be understood, if a prospective peeper 34A, 34B, or 34C cannot see the virtual interface 22, determining the data being entered by a user 26 on that interface 22 is made more difficult. However, as noted above, it is possible for a peeper 34A, 34B, or 34C to intercept data without seeing the interface, if they know the arrangement of that interface.

With reference to FIG. 2B and FIG. 2C, virtual interfaces 22 are shown thereon with identical arrangements of keys. However, unlike mechanical interfaces, a virtual interface 22 can be readily altered to provide additional security. While a prospective peeper might be able to interpret a user's motions in entering data without seeing the interface so long as the peeper knows the configuration of that interface, altering a virtual interface 22 renders such interpretation impractical.

Figure 4A:
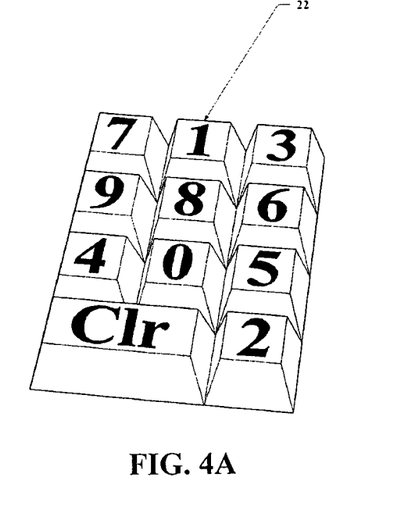
FIG. 4A illustrates another virtual interface, in the form of a scrambled keypad.

For example, FIG. 4A illustrates another embodiment of a virtual interface 22. Like those shown in FIG. 2B and FIG. 2C, the interface 22 in FIG. 4A is in the form of a numeric keypad; indeed, the interface 22 is so similar as to use the same number of keys in the same geometry, and the same symbols on those keys. However, the numbers are arranged differently in FIG. 4A.

Given such an arrangement, the motion that would constitute entry of the key with the number 8 by a user interacting with the interface 22 of FIG. 2C would instead constitute entry of the key with the number 1 by the user interacting with the interface 22 of FIG. 4A. Thus, the same motion, made with a different virtual interface 22, can correspond with different data.

Unlike a mechanical data entry interface, a virtual interface 22, lacking physical substance, can be readily rearranged or reconfigured. For example, an apparatus 10 could shift between the interface 22 shown in FIG. 2C and that shown in FIG. 4A simply by outputting different images on displays 12 and 14. Such a change could be made in a number of ways. In some embodiments, the configuration of the virtual interface 22 could be altered manually, with the user directly rearranging the keys. In other embodiments, a function could be provided such that the user can elect to rearrange the interface 22, and the interface 22 would then randomize, move to the next in a series of predetermined configurations, etc. In yet other embodiments, the interface 22 could automatically change its configuration. Automatic reconfiguration could execute for every use, after every several uses, at time intervals, etc.

Figure 4B:
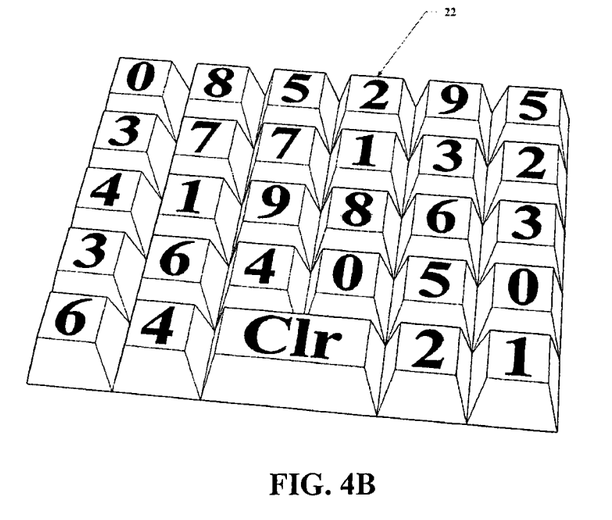
FIG. 4B illustrates another virtual interface, in the form of a scrambled keypad with multiple iterations of symbols.

In addition, as a virtual construct, a virtual interface 22 is not limited only to a specific geometry or functionality. For example, another virtual interface 22 is shown in FIG. 4B. That interface 22 has numeric keys similar to those in FIG. 4A, but here the interface 22 has more such keys. In particular, the interface 22 in FIG. 4B has multiple iterations of the individual numeric symbols, e.g. there are three keys marked with the number 5. For a virtual interface 22 in accordance with the principles of the present invention, the configuration in FIG. 2C might be used on one occasion, that shown in FIG. 4A used on another occasion, and that shown in FIG. 4B on yet another occasion.

Such flexibility in the configuration of the virtual interface 22 secures the apparatus 10 against memorization of any particular configuration. Even if somehow individual configurations can be seen (which as described above is problematic for the present invention), memorizing one or even many configurations does not provide reliable insight into the configuration of the virtual interface 22 at the time that a user is entering data.

Thus, an apparatus 10 in accordance with the principles of the present invention is doubly secure against peeping: the virtual interface 22 is visible substantially only to the user, and the actions of the user cannot be reliably correlated by a peeper with any particular configuration of an interface 22 in such a way as to determine the data being entered, because the configuration of the interface 22 cannot be reliably predetermined by the peeper.

Although the preceding description has referred, for simplicity, to a virtual interface 22 in the form of a simple numeric keypad, this is an example only. While keypads, including but not limited to numeric, alphabetic, and alphanumeric keypads, may be advantageous for certain embodiments, a wide range of other interfaces may be equally suitable.

For example, a virtual interface 22 that is an analog of a different mechanical interface or device may be suitable for some embodiments.

Figure 5A:
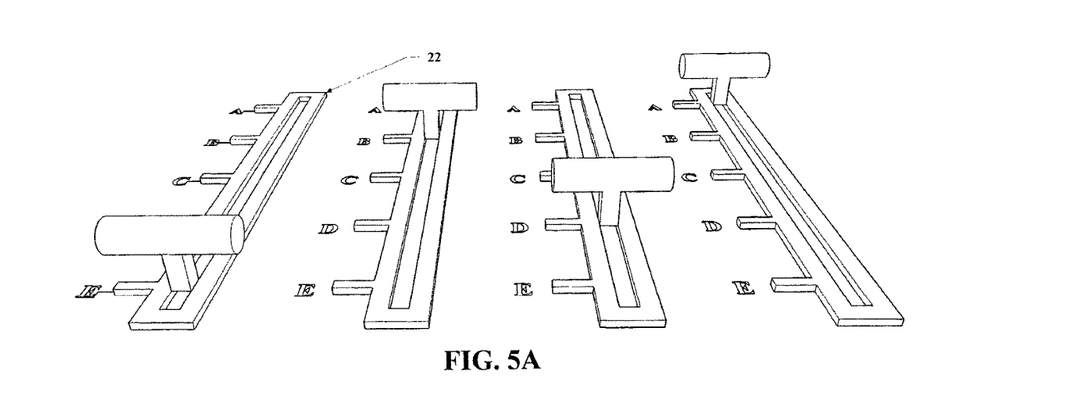
FIG. 5A illustrates another virtual interface, in the form of a set of marked sliders.

FIG. 5A illustrates another embodiment of a virtual interface 22. As shown, the interface 22 is in the form of a set of virtual sliders, each slider being marked with letters. A user would adjust the sliders to enter data in the form of a series of letters. Alternatively, numbers or other characters might be used instead of letters.

Figure 5B:
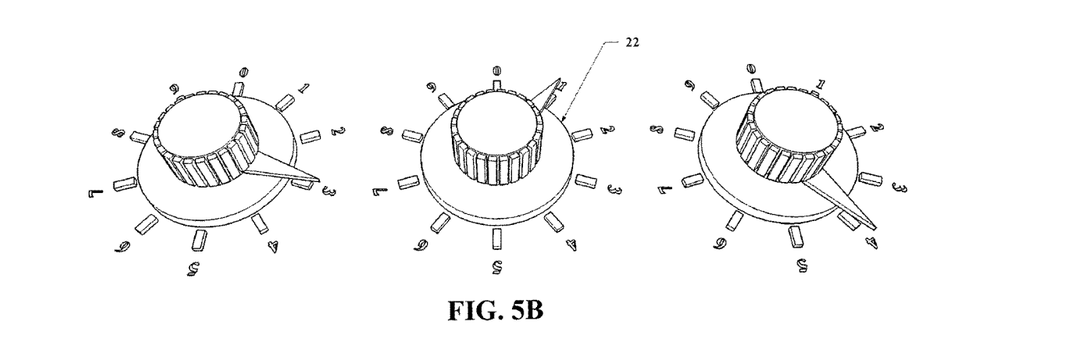
FIG. 5B illustrates another virtual interface, in the form of a set of marked wheels.

FIG. 5B illustrates another embodiment of a virtual interface 22. As shown, the interface 22 is in the form of a set of virtual wheels, each wheel being marked with numbers. A user would adjust the wheels to enter data in the form of a series of letters. Alternatively, letters or other characters might be used instead of numbers.

Figure 5C:
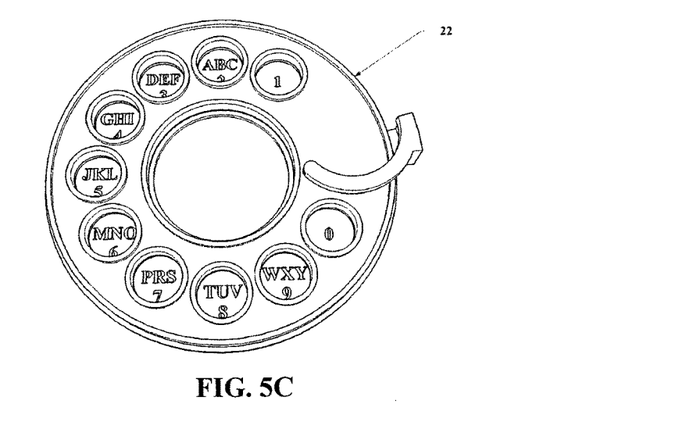
FIG. 5C illustrates another virtual interface, in the form of a rotary dial.

FIG. 5C illustrates another embodiment of a virtual interface 22. As shown, the interface 22 is in the form of a virtual rotary dial, comparable to that used on some telephones. A user would activate the dial, so as to enter a series of numbers or letters.

It is noted that although the above examples refer to the use of letters and numbers as markings, this is done as an example only. Other symbols, markings, or distinguishing features may be equally suitable, including but not limited to non-alphanumeric characters, musical notes, icons, shapes, colors, etc. In particular, the virtual interface 22 in accordance with the principles of the present invention is not limited to analogs of conventional mechanical or symbol based systems.

Figure 5D:
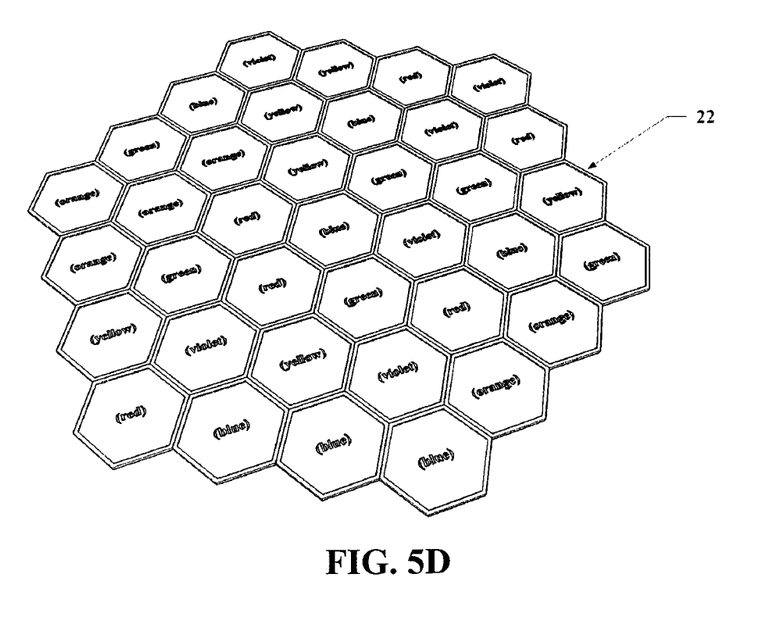
FIG. 5D illustrates another virtual interface, in the form of a color selection palette.

For example, FIG. 5D illustrates another embodiment of a virtual interface 22. As shown, the interface 22 is in the form of a group of color selection panels. A user would enter a sequence of color selections. It is noted that for simplicity, colors on the panels are marked on FIG. 5D with their names, but in practice they may be represented by panels of the colors themselves. Since, as noted earlier, the configuration of the interface 22 can readily be changed, the number, arrangement, and coloration of color panels likewise could readily be changed.

The virtual interfaces 22 shown and described are examples only. Other arrangements, including but not limited to virtual combination locks, virtual geometric interfaces, virtual puzzles, virtual photo manipulations, and other constructs may be equally suitable.

In addition, the apparatus 10 as described and illustrated is also an example only. In particular, the approaches for implementing secure data entry as described herein are not hardware dependent, and could be executed on a wide range of apparatuses.

Figure 6A:
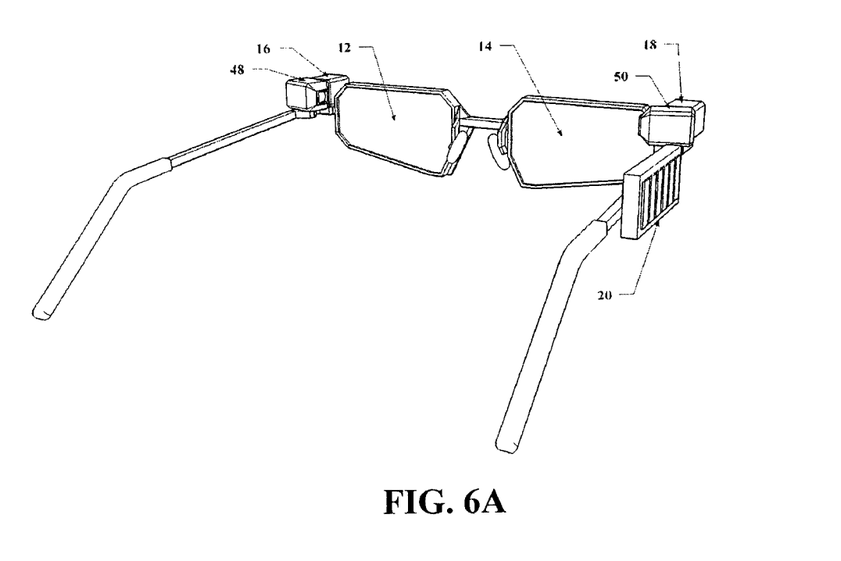
FIG. 6A illustrates another embodiment of an apparatus for secure data entry in accordance with the principles of the present invention, in the form of a 3D head mounted display with additional inward facing cameras.

For example, as shown in FIG. 6A some embodiments of the apparatus 10 may include, in addition to or in place of the forward facing sensors 16 and 18, rearward facing sensors 48 and 50. Where sensors 16 and 18 may be used to determine data entered by the user based on the user's hand motions and/or other events in the area in front of the user, rearward facing sensors 48 and 50 may be used to determine data entered by the user by monitoring actions such as the user's eye motions. Such eye motions might be either voluntary, as the user deliberately looks at different areas (e.g. different symbols displayed on the displays 12 and 14), or involuntary, as the user's eyes track and move naturally.

Figure 6B:
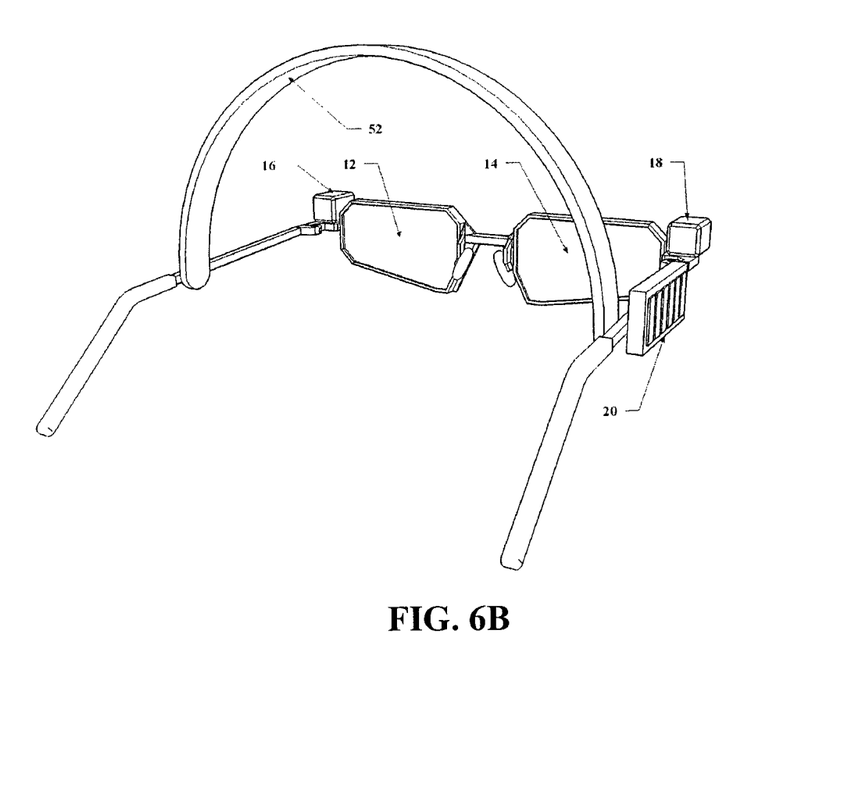
FIG. 6B illustrates another embodiment of an apparatus for secure data entry in accordance with the principles of the present invention, in the form of a 3D head mounted display with a brain sensor.

As another example, as shown in FIG. 6B, some embodiments of the apparatus 10 may include a brain sensor 52. Such a sensor may detect brain events, including but not limited to electromagnetic effects associated with brainwave changes as a user selects or rejects different options, e.g. symbols or arrangements of symbols outputted on displays 12 and 14.

Detection of eye motion and brain events are examples only, and other actions or events may be equally suitable for determining data entry.

In addition, although the invention is illustrated herein as an integrated unit, e.g. a head mounted display, this is an example only. For certain embodiments, it may be advantageous for components to be physically and/or logically separated. For example, sensors 16 and 18 may not be proximate the other elements and the user as illustrated, but could be disposed at some distance from the user, so as to view both any hand gestures by the user and any face/body motions that the user makes. Likewise, the processor 20 might be at some distance from the user and/or the other elements of the apparatus 10, e.g. in communication by wireless means.

One example of such a distributed arrangement would be an embodiment wherein the displays 12 and 14 are used to display content generated by an external processor, as when a user utilizes the present invention as a 3D display for a PC, game console, supercomputer array, etc.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A method, comprising:
generating, by a processor, a virtual data entry interface for a head-mounted display;
generating, by the processor, a first input configuration of the virtual data entry interface for the head-mounted display to securely receive a first input from a viewer;
displaying, by the head-mounted display, the virtual data entry interface with the first input configuration at a defined focus distance and a defined location relative to an eye of the viewer to securely display the virtual data entry interface, wherein:
the defined focus distance is a distance such that the virtual data entry interface is in focus to the eye of the viewer and is not in focus to an eye of another individual;
the defined location is a location on the head-mounted display that is viewable to the eye of the viewer and is not viewable to the eye of the other individual;
receiving, by a sensor, the first input from the viewer, the first input corresponding to the virtual data entry interface with the first input configuration;
in response to receiving the first input, automatically generating, by the processor, a second input configuration for the virtual data entry interface for the head-mounted display to securely receive a subsequent second input from the viewer, wherein the first input configuration is different than the second input configuration such that the viewer performs a second action to input the second input that is different than a first action to input the first input;

displaying, by the head-mounted display, the virtual data entry interface with the second input configuration at the defined focus distance and the defined location relative to the viewer; and receiving, by the sensor, the second input from the viewer, the second input corresponding to the virtual data entry interface with the second input configuration.

2. The method of claim 1, wherein the virtual data entry interface is visible substantially only to the viewer.

3. The method of claim 1, wherein the virtual data entry interface is in focus substantially only to the viewer.

4. The method of claim 2, wherein the virtual data entry interface is outputted such that a line of sight to the virtual data entry interface from anyone except the viewer is substantially obstructed by the viewer.

5. The method of claim 2, wherein the virtual data entry interface is outputted in front of the eye of the viewer, and proximate thereto, so as not to be visible from a point of view behind or adjacent to the viewer.

6. The method of claim 1, further comprising the viewer manually changing the first input configuration of the virtual data entry interface to the second input configuration.

7. The method of claim 1, further comprising the viewer actuating a function to change the first input configuration of the virtual data entry interface to the second input configuration.

8. The method of claim 1, further comprising automatically changing the first input configuration to the second input configuration.

9. The method of claim 8, wherein the first input configuration changes to the second input configuration when the virtual data entry interface is generated.

10. The method of claim 1, wherein the virtual data entry interface comprises a three dimensional (3D) virtual object.

11. The method of claim 1, wherein the virtual data entry interface comprises a keypad comprising multiple iterations of individual symbols.

12. The method of claim 1, wherein receiving the first input or the second input comprises visually detecting an action of the viewer.

13. The method of claim 12, wherein receiving the first input or the second input comprises detecting a manipulation of an end-effector by the viewer.

14. The method of claim 13, wherein receiving the first input or the second input comprises detecting a manipulation of a finger by the viewer.

15. The method of claim 13, wherein receiving the first input or the second input comprises detecting a manipulation of a hand of the viewer.

16. The method of claim 12, wherein receiving the first input or the second input comprises detecting an eye movement of the viewer.

17. The method of claim 12, wherein receiving the first input or the second input comprises detecting a brain event of the viewer.

18. The method of claim 17, wherein receiving the first input or the second input comprises electromagnetically sensing the brain event.

19. The method of claim 1, wherein the virtual data entry interface is outputted so as to appear to the viewer to substantially overlap a physical object.

20. The method of claim 1, wherein:
the first input configuration comprises a first keypad in a first key configuration; and
the second input configuration comprises the first keypad in a second key configuration, the first key configuration being different from the second key configuration.

21. The method of claim 1, wherein:
the first input configuration comprises at least one of a keypad, a slider, a wheel, a dial, or a color selection palette; and
the second input configuration comprises at least another configuration of the keypad, the slider, the wheel, the dial, or the color selection palette.

22. The method of claim 1, wherein the first input configuration comprises at least one of alphanumeric characters, non-alphanumeric characters, musical notes, icons, shapes, or colors.

23. The method of claim 1, wherein the virtual data entry interface is outputted so as to appear to the viewer to be substantially disposed on a physical surface.

24. The method of claim 1, further comprising randomly changing the first input configuration or the second input configuration.

25. An apparatus, comprising:
a first display;
a processor in communication with the first display; and
a first sensor in communication with the processor, wherein the processor is to:
generate a first input configuration of a virtual data entry interface for the first display to securely receive a first input from a viewer;
send, to the first display, the virtual data entry interface with the first input configuration at a defined focus distance and a defined location relative to an eye of the viewer to securely display the virtual data entry interface, wherein:
the defined focus distance is a distance such that the virtual data entry interface is in focus to the eye of the viewer and is not in focus to an eye of another individual;
the defined location is a location on a head-mounted display that is viewable to the eye of the viewer and is not viewable to the eye of the other individual;
receive the first input from the viewer, the first input corresponding to the virtual data entry interface with the first input configuration;
in response to receiving the first input, automatically generate a second input configuration for the virtual data entry interface for the first display to securely receive a subsequent second input from the viewer, wherein the first input configuration is different than the second input configuration such that the viewer performs a second action to input the second input that is different than a first action to input the first input;
send, to the first display, the virtual data entry interface with the second input configuration at the defined focus distance and the defined location relative to the viewer; and
receive a second input from the viewer, the second input corresponding to the virtual data entry interface with the second input configuration.

26. The apparatus of claim 25, further comprising a second display.

27. The apparatus of claim 26, wherein:
the first display and the second display are adapted to output a 3D stereo image; and
the virtual data entry interface is a 3D stereo virtual interface.

28. The apparatus of claim 25, wherein the first sensor comprises a camera.

29. The apparatus of claim 25, further comprising a second sensor.

30. The apparatus of claim 29, wherein the first sensor comprises a first camera and the second sensor comprise a second camera.

31. The apparatus of claim 30, wherein the first sensor and the second sensor are adapted to capture a 3D stereo image, and the processor is adapted to detect an action of the viewer therefrom.

32. The apparatus of claim 25, wherein the first sensor is directed toward a hand of the viewer.

33. The apparatus of claim 25, wherein the first sensor is directed toward a face of the viewer.

34. The apparatus of claim 25, wherein the first sensor comprises a brain sensor.

35. The apparatus of claim 25, wherein the first display, the processor and the first sensor comprise an integral head mounted display.

36. A method, comprising:
generating a first input configuration of a stereo three dimensional (3D) virtual interface to securely receive a first input from a viewer;
outputting the stereo 3D virtual interface with the first input configuration on a head-mounted display, the stereo 3D virtual interface being displayed at a defined focus distance and a defined location relative to an eye of a viewer to securely display the stereo 3D virtual interface, wherein:
the defined focus distance is a distance such that the stereo 3D virtual interface is in focus to the eye of the viewer and is not in focus to an eye of another individual;
the defined location is a location on the head-mounted display that is viewable to the eye of the viewer and is not viewable to the eye of the other individual;
detecting with stereo 3D image capture the viewer manipulating an end-effector in relation to the virtual interface;
receiving a first data set entered by the viewer through the manipulation;
in response to receiving the first data set, automatically generating a second input configuration for the stereo 3D virtual interface to securely receive a subsequent second input from the viewer, wherein the first input configuration is different than the second input configuration such that the viewer performs a second action to input the second input that is different than a first action to input the first input;
outputting the stereo 3D virtual interface with the second input configuration at the defined focus distance and the defined location relative to the viewer; and
receiving the second input from the viewer, the second input corresponding to the stereo 3D virtual interface with the second input configuration.

37. An apparatus, comprising:
a first display and a second display adapted for stereo 3D output;
a processor in communication with the first display and the second display; and
a first sensor and a second sensor in communication with the processor, the first sensor and the second sensor being adapted for stereo 3D image capture, wherein the processor is to:
generate a first input configuration of a virtual data entry interface for the first display or the second display to securely receive a first input from a viewer;
send, to the first display or the second display, the virtual data entry interface with the first input configuration at a defined focus distance and a defined location relative to an eye of the viewer to securely display the virtual data entry interface, wherein:
the defined focus distance is a distance such that the virtual data entry interface is in focus to the eye of the viewer and is not in focus to an eye of another individual;
the defined location is a location on the first display that is viewable to the eye of the viewer and is not viewable to the eye of the other individual;
receive the first input from the viewer, the first input corresponding to the virtual data entry interface with the first input configuration;
in response to receiving the first input, automatically generate a second input configuration for the virtual data entry interface for the first display or the second display to securely receive a subsequent second input from the viewer, wherein the first input configuration is different than the second input configuration such that the viewer performs a second action to input the second input that is different than a first action to input the first input;
send, to the first display or the second display, the virtual data entry interface with the second input configuration at the defined focus distance and location relative to the viewer; and
receive the second input from the viewer, the second input corresponding to the virtual data entry interface with the second input configuration.

38. An apparatus, comprising:
means for generating a virtual interface;
means for generating a first input configuration of the virtual interface for a head-mounted display to securely receive a first input from a view;
means for displaying the virtual interface with the first input configuration at a defined focus distance and a defined location relative to an eye of a viewer to securely display the virtual interface, wherein:
the defined focus distance is a distance such that the virtual interface is in focus to the eye of the viewer and is not in focus to an eye of another individual;
the defined location is a location on the head-mounted display that is viewable to the eye of the viewer and is not viewable to the eye of the other individual;
means for receiving a first input from the viewer, the first input corresponding to the virtual interface with the first input configuration;
means for, in response to receiving the first input, automatically generating a second input configuration for the virtual interface for the head-mounted display to securely receive a subsequent second input from the viewer, wherein the first input configuration is different than the second input configuration such that the viewer performs a second action to input the second input that is different than a first action to input the first input;
means for displaying the virtual interface with the second input configuration at the defined focus distance and location relative to the viewer; and
means for receiving the second input from the viewer, the second input corresponding to the virtual interface with the second input configuration.

39. The apparatus of claim 38, wherein the virtual interface is outputted in front of the eye of the viewer, and proximate thereto, so as not to be visible from a point of view behind or adjacent to the viewer.

40. The apparatus of claim 38, wherein the virtual interface is a stereo 3D virtual interface.

41. The apparatus of claim 38, wherein the means for receiving the first input or the second input detects viewer motions.

42. The apparatus of claim 38, wherein the apparatus is a head mounted display.

43. The apparatus of claim 38, wherein the means for generating the second input configuration changes the first input configuration to the second input configuration when the second input configuration is generated.

* * * * *